United States Patent [19]

Taki

[11] 4,344,741
[45] Aug. 17, 1982

[54] AUTOMATIC WATER SUPPLY SYSTEM

[75] Inventor: Tomohiko Taki, Hitachi, Japan

[73] Assignee: Hitachi, Ltd., Tokyo, Japan

[21] Appl. No.: 131,423

[22] Filed: Mar. 18, 1980

[30] Foreign Application Priority Data

Mar. 22, 1979 [JP] Japan .................. 54-32374

[51] Int. Cl.$^3$ ............................. F04B 49/02
[52] U.S. Cl. .................. 417/28; 200/83 L;
 200/83 Q; 417/29; 417/38
[58] Field of Search .............. 200/83 L, 83 Q, 83 J;
 417/38, 36, 26, 28, 29, 30, 31; 137/399, 395, 539, 396

[56] References Cited

U.S. PATENT DOCUMENTS

| | | | |
|---|---|---|---|
| 763,115 | 6/1904 | Robinson | 137/399 |
| 1,176,107 | 3/1916 | Tucker | 137/399 |
| 2,248,363 | 7/1941 | Kuenhold | 137/396 X |
| 3,109,908 | 11/1963 | Clason | 200/83 L |
| 3,551,071 | 12/1970 | Hoover | 417/43 |
| 4,002,184 | 1/1977 | Tubbs et al. | 417/38 X |
| 4,081,621 | 3/1978 | Hartley | 417/38 X |

FOREIGN PATENT DOCUMENTS

| | | | |
|---|---|---|---|
| 2658851 | 6/1978 | Fed. Rep. of Germany | 417/38 |
| 49-43285 | 11/1974 | Japan . | |
| 54-10410 | 1/1979 | Japan | 417/38 |
| 55-32906 | 3/1980 | Japan | 417/38 |

Primary Examiner—Carlton R. Croyle
Assistant Examiner—Edward Look
Attorney, Agent, or Firm—Craig and Antonelli

[57] ABSTRACT

A water supplying system has a pneumatic tank storing water and confining compressed air therein. The pneumatic tank is adapted to be charged with water by a pump. The supply of compressed air into the pneumatic tank is controlled in such a manner as to maintain a constant amount of compressed air in the pneumatic tank. A pressure-responsive device is attached to a water service pipe through which the water is discharged from the pneumatic tank and delivered to faucets or the like. The pressure-responsive device has a pressure-responsive valve adapted to break the communication between the pneumatic tank and the water service pipe when the water level in the pneumatic tank has come down near the port of the tank connected to the water service pipe, and a pressure switch adapted to control the operation of the motor for driving the pump in relation to the operation of said pressure-responsive valve.

7 Claims, 5 Drawing Figures

AUTOMATIC WATER SUPPLY SYSTEM

BACKGROUND OF THE INVENTION

The present invention relates to an automatic water supply system and, more particularly, to a pneumatic tank type automatic water supplying system in which a pneumatic tank is charged with excessive air.

It is known that an excessive charge of a pneumatic tank of automatic water supply system increases the effective volume of the tank to permit an efficient use of the tank.

However, if the pneumatic tank is used with excessive air charged therein, the air is inconveniently discharged from the tank into the water service pipe when the water level has come down, i.e. when the internal pressure of the pneumatic tank has become low. This air is mixed with the water in the water service pipe to splash the water when the latter is discharged from the faucet to give the user an unpleasant feeling.

An example of pneumatic tank type automatic water supplying system capable of overcoming this problem is shown in Japanese Patent Publication No. 43285/1974. This system is provided with a water-level responsive type valve, i.e. float valve, adapted to close the water outlet port of the pneumatic tank when the water level has come down below a predetermined level, in order to prevent the discharge of air into the water service pipe. This float valve, however, shakes due to a change in the flow of water within the tank, so that the air is released into the water service pipe when the water level in the pressure tank has come down, resulting in an intermittant or a fluctuating of the rate of water supply.

SUMMARY OF THE INVENTION

It is, therefore, an object of the invention to provide an automatic water supplying system capable of preventing the release of air from the pneumatic tank.

It is another object of the invention to provide an automatic water supplying system capable of eliminating undesirable intermittant or fluctuating rate of the water supply.

It is still another object of the invention to provide an automatic water supplying system which can obviate water hammer attributable to an abrupt pressure increase in the water service pipe.

To these ends, according to the invention, there is provided a pneumatic tank type automatic water supplying system comprising a pressure-responsive valve, i.e. a diaphragm-actuated valve disposed at the outside of the pneumatic tank and adapted to block the water supplied from the pneumatic tank into the water service pipe, upon detecting a lowering of the water level, i.e. a lowering of the internal pressure of the pneumatic tank. Therefore, the water service pipe is blocked when the internal pressure of the pneumatic tank has become low due to a lowering of the water level, so that the air confined in the pneumatic tank is prevented from being released into the water service pipe. Consequently, the aforementioned intermittent and fluctuating rate of water supply are fairly avoided.

According to another aspect of the invention, the first valve for blocking the water service pipe incorporates a second valve adapted to permit the water to flow only in one direction from the water service pipe back to the pneumatic tank, when the water pressure in the water service pipe is increased to an extraordinarily high level.

DESCRIPTION OF THE PREFERRED EMBODIMENTS

Figure 1:
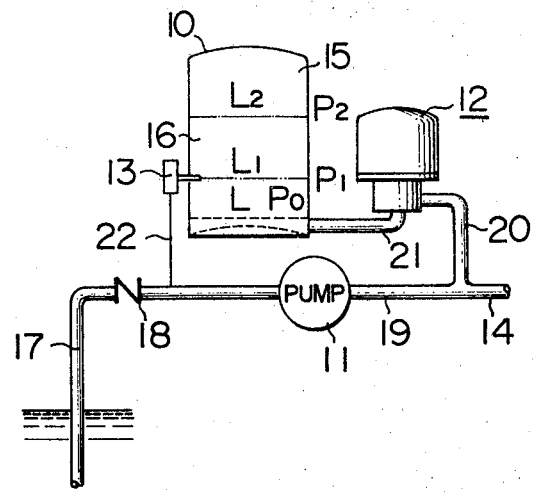
FIG. 1 shows the whole part of the water supplying system constructed in accordance with an embodiment of the invention.

Referring first to FIG. 1, an automatic water supplying system of the invention includes a pump 11 adapted to suck water through a suction pipe 17 and to deliver the same into a pneumatic tank 10 through a water charging pipe 19. Also, an air charger 13 acts to control the air supply to the pneumatic tank 10 in such a manner so as to maintain a constant amount of compressed air in the pneumatic tank 10. Further, a pressure-responsive device 12 controls the starting of the pump 11 and stopping of the water flowing from the pneumatic tank 10 into the water service pipe 14.

In the arrangement shown in FIG. 1, both the water supplied by the pump 11 to the pneumatic tank 10 and the water discharged from the pneumatic tank 10 to the water service pipe 14 flow the line constituted by a series connection of a first connection pipe 21 and a second connection pipe 20. This arrangement, however, is not exclusive. And it is possible to provide a by-pass pipe (not shown) parallel to the first and the second connection pipes 21, 20 to directly connect the water charging pipe 19 to the pneumatic tank 10, so that the water is supplied to the pneumatic tank 10 through the by-pass pipe, whereas the water discharged from the tank 10 flows into the water service pipe 14 through the first connection pipe 21, pressure-responsive device 12 and the second connection pipe 20.

As will be described later with reference to FIG. 2, the pressure-responsive device 12 has a pressure-responsive valve adapted to provide an ON-OFF control of the water flowing from the pneumatic tank 10 to the water service pipe 14, and a pressure switch. Although the pressure-responsive valve and the pressure switch are combined as a unit to constitute a pressure-sensitive valve in the illustrated embodiment, they may be mounted on the connection pipes 20, 21 independently of each other.

Also, the connection of the connection pipes 20, 21 to the pressure-responsive device 12 shown in FIG. 1 may be altered such that the first connection pipe is connected to the water charging pipe 19 and the water service pipe 14, while the second connection pipe is connected to the pneumatic tank 10.

Reference numerals 18 and 22 denote, respectively, a check valve disposed in the suction pipe 17 and a tube connected between the air charger 13 and the suction pipe 17.

Preferably, the control of air to the pressure tank 10 is made in such a manner that the pneumatic tank 10 is charged with air in excess of ordinary amount, and the water level, i.e. the intersurface between the water and air, is positioned slightly above the level of the first connection pipe 21 when the internal pressure in the pneumatic tank 10 has come down to the level at which the pressure-responsive device 12 acts to stop the water supply to the water service pipe 14.

Compressed air 15 is confined in the pneumatic tank 10 together with water 16, so as to be expanded and compressed in accordance with the water level in the pneumatic tank 10. The pressure switch, which will be described in detail later, is adapted to be opened at an internal pressure $P_2$ corresponding to the upper limit water level $L_2$ and closed at an internal pressure $P_1$ corresponding to the lower limit water level $L_1$. The pressure-responsive valve, which will be also be described in detail later, is adapted to be closed when the internal pressure of the pneumatic tank has come down to $P_0$ lower than $P_1$, i.e. when the water level has come down to the lowermost level L.

Figure 2:
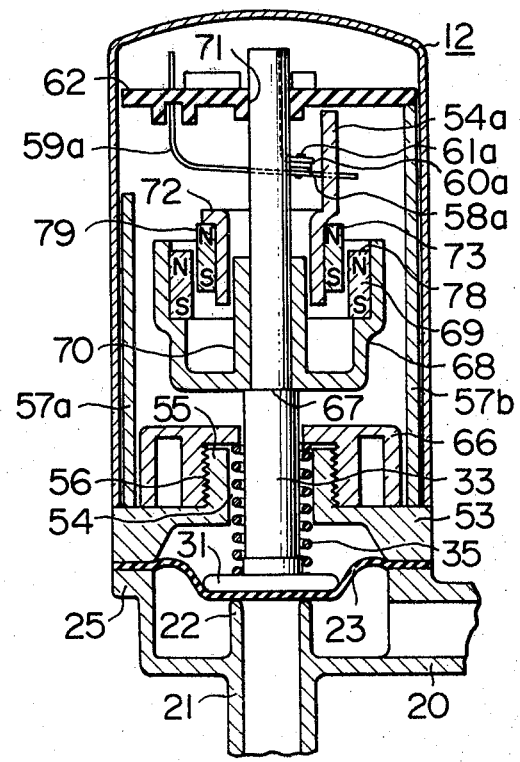
FIG. 2 is a sectional view of a pressure-responsive device incorporated in the water supplying system of the invention, with a pressure switch thereof in the closed state in response to the lowering of the pressure in the water service pipe.

Referring now to FIG. 2 showing the pressure-responsive device 12, the pressure-responsive valve and the pressure switch in combination constitute the pressure-responsive device 12. The pressure-responsive valve has, in combination, a water-pressure detecting section of a known construction and a valve for opening and closing the water passage.

A socket 25 is provided for connecting the pressure-responsive device 12 to the first and second connection pipes 21, 20. The pressure in the first connection pipe 21 is transmitted to a flange 31 through a diaphragm valve 23. A boss 55 provided with a bore 54 is formed at the center of a base 53. A screw thread 56 is formed on the outer peripheral surface of the boss 55.

One end of a plunger 33 contacts the diaphragm valve 23 through the flange 31. A cap nut 66 for adjusting the operating pressure of the diaphragm valve 23 is screwed to the thread 56 on the boss 55. It will be seen that the resilient compression force of the compression spring 35 acting on the diaphragm valve 23 is adjusted by rotating the cap nut 66, so that the operating pressure of the diaphragm valve 23, i.e. the pressure at which the diaphragm valve 23 makes on and off actions, is controlled and adjusted.

A pressure drop in the first connecting pipe 21 is detected by the water-pressure detecting section constituted by the diaphragm valve 23, flange 31 and the compression spring 35. More specifically, the diaphragm valve 23 is depressed by the spring 35 into contact with a valve seat 22 formed in the socket 25 to interrupt the communication between the first connection pipe 21 and the second communication pipe 20 to stop the discharge of the water from the pneumatic tank 10. Thus, the diaphragm valve 23 and the valve seat 22 in combination constitute a valve for opening and closing the water passage.

A description will be made hereinunder as to the construction of the pressure switch of the pressure-responsive device 12. Supporting columns 57a, 57b, having arcuate cross-sections, are provided on the outer peripheral portion of the base 53. An insulating base 62 is fixed to the upper end of the supporting column 57b. A movable segment 59a having a movable contact 58a and a fixed segment 61 having a fixed contact 60a are attached to an insulating base 62.

The plunger 33 is provided with a step 67 formed at a central portion thereof. An outer cylinder 68 has attached thereto a cylindrical driving magnet 69 made of a compacted magnetic powders and magnetized to have N and S poles on the upper and lower or inner and outer peripheral surfaces thereof. The outer cylinder 68 has a central boss 70 fitted to the plunger 33. The outer cylinder 68 engages at its lower end with the step 67 and is fixed at its upper end to the plunger 33 by caulking. The other end of the plunger 33 is supported in a bearing 71 provided at the center of the insulating base 62.

An inner cylinder 72 has fixed thereto a driven magnet 73 made of compacted magnetic powders and magnetized to have N and S poles on the upper and lower or inner and outer peripheral surfaces. A blade 54a for actuating the movable contact segment 59a is formed on the upper end of the inner cylinder 72 unitarily with the latter.

The driven magnet 73 is disposed at the inside of the driving magnet 69 to at a uniform gap preserved therebetween. These magnets 69 are magnetized so as to produce a repulsion therebetween. Also, the lengths of the poles are equalized to maximize the repulsion. The inner peripheral surface of the inner cylinder 72 slidably fits the outer peripheral surface of the boss 70 of the outer cylinder 68.

As the pressure in the first connecting pipe 21 is decreased, the inner cylinder 72 is urged in the direction Q1 by the repulsion acting between the driving and driven magnets 69, 73. The movable contact 58a, therefore, is held in contact with the fixed contact 60a.

The driving motor for driving the pump 11 is started as the movable contact 58 makes contact with the fixed contact 58a, so that water is supplied into the pneumatic tank 10. If desired, a plurality the movable and fixed contacts 58a, 60a may be provided.

As the pressure in the first connection pipe 21 is increased, the diaphragm valve 23 receiving this increased pressure is deflected to move the plunger 33 upward gradually and in proportion to the change of the water pressure, overcoming the force of the spring 35. In consequence, the outer cylinder 68 is moved upward and, as a result, the driven magnet 73 is abruptly moved downward by the repulsion acting between itself and the driving magnet 69, so that the movable segment 59a is depressed to quickly separate the movable contact 58a from the fixed contact 60a. The pump 11 is therefore stopped to lower the pressure in the first connection pipe 21 which in turn causes the outer cylinder 68 and the plunger 33 as a unit to move downward by the pressing force of the spring 35 overcoming the force generated by the water pressure.

Immediately after the lowering of the end surface 78 below the end surface 79 in the direction Q1, the inner cylinder 72 is abruptly inversed and reset to the upper position, to thereby quickly bring the movable contact 58a into contact with the fixed contact 60a.

The pressure switch incorporated in the pressure-responsive device 12 in the water-supplying system of the invention can make a switching operation without fail and without any loss of power due to friction, because a quick mechanical action is performed by the repulsion occuring between two magnets 69, 73 with reduced number of mechanical parts.

The water supplying system of the invention heretofore described operates in a manner explained hereinafter.

During the supply of water from the faucet, the pump 11 is running to maintain the water level in the pneumatic tank 10 between the upper limit L2 and the lower limit L1.

The water level is raised again as the water supply from the faucet is stopped. When the internal pressure of the pneumatic tank 10 is increased to P2 as a result of rise of the water level up to the upper limit L2, the pressure switch of the pressure-responsive device 12 is turned off to cut the power supply to the pump 11.

Then, as the water supply from the faucet is commenced again, the water 16 in the pneumatic tank 10 is displaced to lower the water level from the upper limit L2 down to the lower limit L1, so that the pressure switch of the pressure-sensitive device 12 is turned on to start the pump 11.

In case of a power failure or an excessively large demand for the water supply, the water level comes down below the lower limit L1 accompanied by a further lowering of the internal pressure. When the water level is lowered to the lowermost level L corresponding to the internal pressure $P_0$, the compressed air 15 tends to come into the water service pipe 14 together with the water. This, however, is fairly avoided in the system of the invention because the diaphragm valve 23 of the pressure-responsive device 12 interrupts the communication between the pneumatic tank 10 and the water service pipe 14, upon detect of the internal pressure $P_0$ corresponding to the lowermost water level L.

This advantageously permits a charging of the pneumatic tank 10 with a larger amount of compressed air 15. The amount of air charging the pneumatic tank 10 can be increased to afford an efficient use of the pneumatic tank, if the lowermost level L corresponding to the pressure P, somewhat lower than the pressure $P_1$, is selected to be slightly above the level of the connection pipe 21.

As will be understood from the foregoing description, the release of air from the pneumatic tank 10 into the water service pipe 14 is completely avoided, because the valve of the pressure-responsive device 12 operates together with the pressure switch which is actuated by a repulsion acting between two magnets 69, 73. The unfavourable intermittant of water supply or fluctuation of rate of supply of the water in the water service pipe 14 is completely eliminated.

Figure 4:
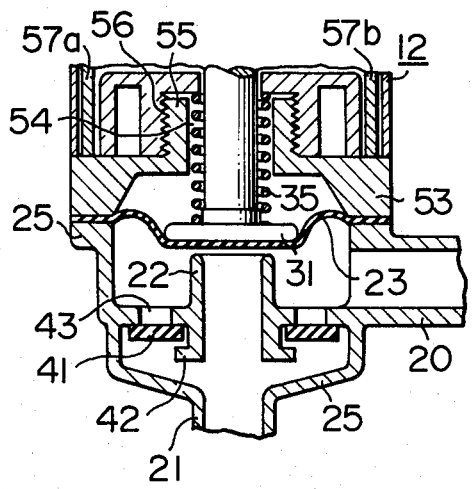
FIG. 4 is a sectional view of a part of a pressure-responsive device incorporated in the water supplying system of the invention provided with a valve for preventing a water hammer, showing in section the pressure-responsive valve in the state responding to a lowered water pressure in the water supplying pipe.
Figure 5:
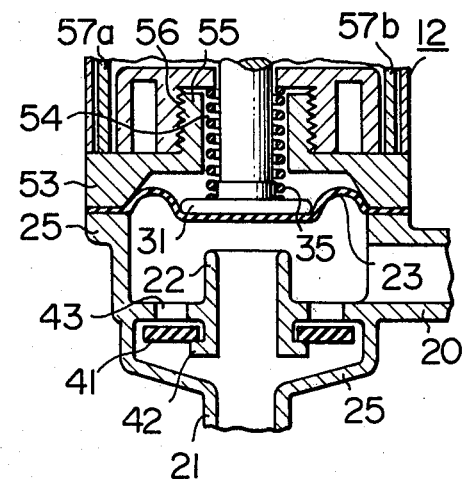
FIG. 5 is a sectional view of a part of the pressure switch shown in FIG. 4, showing in section the pressure-responsive valve responding to an increased water pressure in the water service pipe.

FIGS. 4 and 5 shows a part of a pressure-responsive device 12 which is provided with a by-pass passage connected between the water service pipe 14, i.e. the second connection pipe 20 and the pneumatic tank 10, i.e. the first connection pipe 21. This by-pass passage 43 is associated with a by-pass check valve 41 which permits the water to flow only in the direction from the second connection pipe 20 to the first connection pipe 21. This by-pass check valve is constituted by an elastic O-ring fitted to a recess above a flange 42 formed integrally with the valve seat 22.

Figure 3:
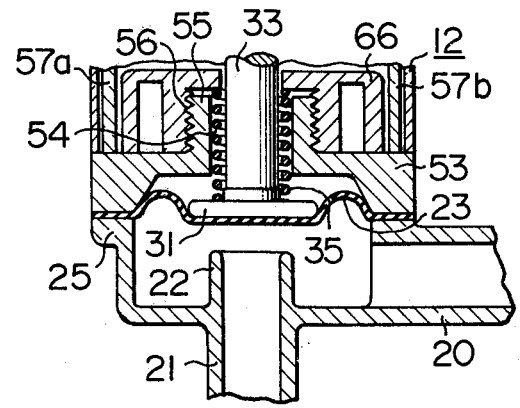
FIG. 3 is a sectional view of a part of the pressure switch shown in FIG. 2, showing the position or state of a pressure-responsive valve responding to an increased water pressure in the water supplying pipe.

In FIGS. 4 and 5, same reference numerals are used to denote the same parts or members as those of FIGS. 2 and 3.

The by-pass passage 43 in this embodiment is assumed to have a cross-sectional area approximating that of the water service pipe 14 and the second connection pipe 20.

The pressure-responsive device as shown FIG. 4 offers the following advantage. It is often experienced that the water pressure in the water service pipe 14 is abruptly increased due to various reasons. However, in the described embodiment, such an abrupt pressure rise is absorbed by the pneumatic tank 10, because the pressurized water flows directly into the latter through the by-pass passage 43 forcibly opening the by-pass check valve 41. Therefore, the undesirable chattering, which tends to take place due to water hammer and other abrupt pressure increase, is eliminated when the diaphragm valve 23 opens. The other parts than the function of prevention of water hammer stated above are materially identical to those of the pressure-responsive device shown in FIGS. 2 and 3.

It is preferred to select the cross-sectional area of the by-pass passage 43 to be equal to that of the first connection pipe 21, or to select the cross-sectional areas of the by-pass passage 43 and the first connection pipe 21 to be greater than that of the second connection pipe 20.

If the sizes of the by-pass passages and connection pipes do not meet the above-mentioned requirement, the pressure in the second connection pipe 20 is increased when the pressurized water from the pump 11 comes into the pneumatic tank 10, so that the pump 11 is stopped before the water level in the pneumatic tank 10 reaches the upper limit L2.

However, if the above-mentioned requirement is fully met, the pressure in the second connection pipe 20 is never increased when the pressurized water from the pump 11 flows into the pneumatic tank 10, so that the water level can be increased to the upper limit L2 without fail.

From the foregoing description, it will be understood that the water supplying system of the invention can increase the effective usable volume of the pneumatic tank and prevent the undesirable carrying over of the air from the pneumatic tank. In addition, unfavourable phenomenon such as intermittant of water supply and fluctuation of rate of water supply from the water service pump, as well as water hammer, are fairly avoided.

What is claimed is:

1. An automatic water supplying system comprising:
   a pneumatic tank for storing therein and confining compressed air;
   a water suction pipe for feeding water to the pneumatic tank;
   a pump connected to the water suction pipe and being adapted to suck water through the suction pipe;
   a pressure switch operatively connected to said pump and adapted to turn said pump on when internal air pressure in the pneumatic tank is decreased to a first predetermined limit and off when the internal air pressure in said pneumatic tank is increased to a predetermined upper limit;
   an air charger operatively connected to said pneumatic tank and adapted to control an air supply to said pneumatic tank such that a constant amount of compressed air is confined in said pneumatic tank;
   a water service pipe connected to said pneumatic tank through which the water is discharged;
   a pressure responsive valve means for detecting water pressure in said water service pipe and being adapted to shut off a flow of water through said water service pipe when the internal air pressure in the pneumatic tank is decreased to a second predetermined lower limit which is less than the first predetermined lower limit;

a first opening end of said pressure responsive valve means is connected to said pneumatic tank, and a second opening end is connected to a discharge side of said pump and to said water service pipe.

2. An automatic water supplying system as claimed in claim 1, wherein a by-pass passage is provided at the pressure responsive valve means for permitting the water to flow from said water service pipe to said pneumatic tank, by passing said pressure-responsive valve means.

3. An automatic water supplying system as claimed in claim 2, wherein a cross-sectional area of said water service passage is materially equal to a cross-sectional area of said by-pass passage.

4. An automatic water supplying system according to claim 1, wherein the second predetermined lower limit is reached when a water level in the pneumatic tank is at its lowest permissible level.

5. An automatic water supplying system according to claim 1, wherein the pressure responsive valve means is adapted to shut off the flow of water through said service pipe when the water pressure in the water service pipe approaches zero.

6. An automatic water-supplying device comprising:
a pneumatic tank for storing water therein and confining compressed air;
a water suction pipe for feeding water to the pneumatic tank;
a pump connected to the water suction pipe and being adapted to suck water through the suction pipe;
a pressure switch operatively connected to said pump and adapted to turn said pump on and off upon detecting a predetermined pressure in said pneumatic tank;
an air charger operatively connected to said pneumatic tank and adapted to control an air supply to said pneumatic tank such that a contant amount of compressed air is confined in said pneumatic tank;
a water service pipe connected to said pneumatic tank through which the water is discharged; and
a water pressure detecting means operatively connected to the water service pipe for detecting water pressure in the water service pipe and being adapted to break a communication between said pneumatic tank and the water service pipe when the pressure in the water service pipe approaches zero, the water-pressure detecting means being operatively connected to the pressure switch so as to form a pressure-responsive device.

7. An automatic water supplying system as claimed in claim 6, wherein said pressure-responsive device further includes:
a driving magnet mounted coaxially with a shaft of said water-pressure detecting means and adapted to be displaced in an axial direction following an axial displacement of said water-pressure detecting means;
a driven magnet arranged in opposition to said driving magnet, said driving and driven magnets being magnetized such that opposing portions of these magnets have the same polarity, said driven magnet being adapted to be displaced in an axial direction repulsing an axial displacement of said driving magnet; and
said pressure switch includes a fixed contact and movable contact, said movable contact being movable into and out of contact with said fixed contact in accordance with the axial displacement of said driven magnet.

* * * * *